(12) United States Patent
Lucas et al.

(10) Patent No.: US 8,422,534 B2
(45) Date of Patent: Apr. 16, 2013

(54) SYSTEM AND METHOD FOR TRANSMITTING DATA OF A DATA STREAM

(75) Inventors: Rainer Lucas, Bietigheim-Bissingen (DE); Thorsten Huck, Angelbachtal (DE)

(73) Assignee: Robert Bosch GmbH, Stuttgart (DE)

( * ) Notice: Subject to any disclaimer, the term of this patent is extended or adjusted under 35 U.S.C. 154(b) by 835 days.

(21) Appl. No.: 12/304,810

(22) PCT Filed: Nov. 29, 2007

(86) PCT No.: PCT/EP2007/063028
§ 371 (c)(1),
(2), (4) Date: May 26, 2009

(87) PCT Pub. No.: WO2008/074607
PCT Pub. Date: Jun. 26, 2008

(65) Prior Publication Data
US 2010/0002753 A1 Jan. 7, 2010

(30) Foreign Application Priority Data
Dec. 18, 2006 (DE) .................. 10 2006 059 689

(51) Int. Cl.
*H04B 1/00* (2006.01)
(52) U.S. Cl.
USPC ............................................. 375/146
(58) Field of Classification Search ......... 375/130, 375/140–141, 146, 219; 370/320–321, 335, 370/337, 350, 438
See application file for complete search history.

(56) References Cited

U.S. PATENT DOCUMENTS

| | | | |
|---|---|---|---|
| 5,355,389 A | 10/1994 | O'clock et al. | |
| 5,862,132 A * | 1/1999 | Blanchard et al. | 370/342 |
| 6,577,231 B2 * | 6/2003 | Litwin et al. | 375/356 |
| 7,433,906 B2 * | 10/2008 | Ladyzhenskii | 708/252 |
| 2002/0167928 A1 | 11/2002 | Terry et al. | |
| 2003/0052771 A1 | 3/2003 | Enders et al. | |
| 2003/0076221 A1 * | 4/2003 | Akiyama et al. | 340/310.01 |
| 2003/0076812 A1 * | 4/2003 | Benedittis | 370/350 |
| 2004/0081077 A1 * | 4/2004 | Mennekens et al. | 370/208 |
| 2005/0040709 A1 | 2/2005 | Enders et al. | |
| 2007/0286225 A1 * | 12/2007 | Enders et al. | 370/438 |

FOREIGN PATENT DOCUMENTS
DE 101 42 408 4/2003
DE 101 42 409 4/2003
(Continued)

OTHER PUBLICATIONS

International Search Report, PCT/EP2007/063028 dated Apr. 21, 2008.

*Primary Examiner* — Khanh C Tran
(74) *Attorney, Agent, or Firm* — Kenyon & Kenyon LLP (57) ABSTRACT

In a subscriber of a communication system for transmitting data of a data stream in time slots of recurring communication cycles, the communication system includes a communication medium, the subscriber, and at least one additional subscriber. The subscribers are connected to the communication medium for data transmission purposes. To allow better utilization of the available frequency range for data transmission, the subscribers have device(s) for spectral spreading of the data of the data stream before transmission via a certain code sequence and have device(s) for transmitting the spread data in the time slots of the recurring communication cycles. The communication system is preferably designed as a FlexRay communication system, the spread data being transmittable in chronological synchronization in a time slot of the communication cycle by various subscribers of the system. The communication medium is preferably designed as a powerline structure via which the subscribers are supplied with electrical power.

11 Claims, 5 Drawing Sheets

FOREIGN PATENT DOCUMENTS

| | | |
|---|---|---|
| DE | 10 2004 008 910 | 9/2005 |
| EP | 1 289 164 | 3/2003 |
| WO | WO 92/02094 | 2/1992 |

* cited by examiner

SYSTEM AND METHOD FOR TRANSMITTING DATA OF A DATA STREAM

FIELD OF THE INVENTION

The present invention relates to a method for transmitting data of a data stream via a communication medium of a communication system in time slots of recurring communication cycles. The present invention also relates to a subscriber of a communication system for transmitting data in time slots of recurring communication cycles. The communication system includes a communication medium, the subscriber, and at least one additional subscriber, the subscribers being connected to the communication medium for the purpose of data transmission. Finally, the present invention relates to a communication system for transmitting data in time slots of recurring communication cycles, including a communication medium having multiple subscribers connected thereto.

BACKGROUND INFORMATION

The CAN (Controller Area Network) protocol, which is frequently used in today's automobiles, will reach its limits in the foreseeable future. The CAN protocol has weaknesses in real-time requirements and the safety relevance of emerging x-by-wire applications in particular. The FlexRay protocol has been developed by a consortium to overcome these restrictions with regard to the special requirements in a motor vehicle. FlexRay is a serial deterministic and fault-tolerant bus system, which meets the increased demands of future networking, in particular higher bandwidths for data transmission, real-time capability and fault tolerance (for x-by-wire systems) in a motor vehicle.

The main requirements considered in the development of FlexRay were a high data transmission rate, deterministic communication, a high fault tolerance, and flexibility. In the FlexRay protocol, information is transmitted in time slots of successive communication cycles. There is a shared understanding of time in the electrical components (network nodes), with the components being synchronized by reference messages (so-called SYNC messages) within a cycle. To allow both synchronous and asynchronous message transmission, the communication cycle is subdivided into a static segment and a dynamic segment, each having at least one time slot (or slot).

The slots of the static segment are assigned to certain messages which are transmitted periodically at certain points in time without competition for the access rights to the FlexRay databus structure. In the static segment of the cycle, the FlexRay databus structure is accessed according to the time division multiplex access (TDMA) method, while during the dynamic segment of the cycle, the bus structure is accessed according to the so-called flexible time division multiple access (FTDMA) method. A so-called mini-slotting method is used for access to the databus structure during the dynamic segment of the cycle. Specification v.2.1 is in effect for the FlexRay protocol. Details of the protocol that might be described here might thus change in the future. Additional information about the FlexRay protocol is available on the Internet at http://www.flexray.de, where several publications have been made accessible to the public.

In closer consideration of a motor vehicle, a networking of various systems having different properties is discernible. Distributed regulating systems usually require cyclical, chronologically synchronized transmission. However, all data not needed constantly, e.g., from vehicle body and comfort applications and/or diagnostic data, may be transmitted asynchronously more advantageously. To allow a deterministic method, the transmission scheme in FlexRay is organized according to cycles. Each communication cycle is divided into a static segment and a dynamic segment of a configurable length. Within the static segment, certain time windows (slots) are allocated to each network node, the messages of the subscriber being transmitted at fixed points in time within these slots. The defined transmission times of the allocated slots ensure a deterministic transmission of data. Bandwidth is allocated in a priority-controlled manner in the dynamic segment of the cycle, i.e., transmission of high-priority messages within one communication cycle is ensured, whereas the point in time of transmission may be delayed for lower-priority messages.

Real-time-relevant and time-critical messages are preferably transmitted in the static segment. The dynamic segment, however, is more suitable for transmission of data having lower real-time requirements. Since these data need not be transmitted in each communication cycle, the network nodes may jointly utilize the available bandwidth in the dynamic segment. The total bandwidth demand is therefore lower; faster repeat rates may be achieved or the baud rate may be reduced by shortening the communication cycle.

Purely static and/or purely dynamic operation is/are also possible owing to the flexibly defined limits between static and dynamic, which opens a broad spectrum of use for FlexRay. In purely dynamic operation, the communication cycle is usually initiated cyclically by a master node. FlexRay also offers the option of initiating the communication cycle through an external event (event triggered).

An alternative communication medium (physical layer) has been developed specifically for this novel protocol. This provides integrated transmission of data and energy on a shared medium. This pertains to high-data-rate powerline communications (HDR-PLC). In contrast with traditional PLC systems from the household field, which rely on an existing infrastructure, a modified (or conditioned) cable tree is used in the case of HDR-PLC, providing an almost ideal transmission function. This allows an inexpensive transceiver structure because a complex receiver structure (e.g., equalizer) may be omitted.

DE 101 42 409 describes powerline communications in a motor vehicle. The structure and embodiment of a conditioned cable tree are described there in particular. DE 101 42 408 describes the use of powerline communications as a redundant databus. DE 10 2004 008 910 describes the use of powerline communications for redundant information transmission in a FlexRay communication system.

SUMMARY

Example embodiments of the present invention provide the most inexpensive possible option so that the bandwidth of a communication system in which data are transmitted in time slots of recurring communication cycles may be utilized better than previously.

To achieve this, it is proposed that the data of the data stream is to be spread spectrally via a certain code sequence prior to transmission and the spread data are then to be transmitted in the time slots of the recurring communication cycles.

According to example embodiments of the present invention, an expansion of the FlexRay TDMA system by a so-called code division multiple access (CDMA) method, preferably by a direct-sequence (DS) CDMA method, is thus proposed. Use as part of powerline communications in a motor vehicle is made possible due to the high quality of the conditioned communication channel. The communication system according to example embodiments of the present invention does justice to the specifications and requirements of a modern communication system. With regard to the critical boundary conditions of various EMC guidelines, it is advantageous that the signal energy is distributed over a broader spectrum and statutory limits may thus be met without any effort in the individual spectral ranges. In addition to specific use in a high-data-rate PLC system, this approach constitutes a perspective that is of fundamental interest for FlexRay systems of any type because it allows chronologically synchronized transmission of multiple messages from various subscribers in one time slot per channel. A time slot according to the FlexRay specification is divided so to speak into a plurality of virtual time slots in which the individual messages are transmitted.

With the approach presented here, it is possible to implement a simple and very efficient as well as inexpensive expansion of the FlexRay system, in particular an HDR-PLC FlexRay system, and to thereby utilize the system much better. With example embodiments of the present invention it is possible to implement an expansion of the data transfer in a very simple manner by even better utilization of the given channel. With FlexRay, a channel is designed for up to 10 Mbit/s connections, for example. This allows spreading of 1 Mbit/s connections by a factor of 10. Furthermore, spreading of the information signal over a wide frequency range allows compliance with EMC guidelines. Spreading distributes the energy of an information symbol over a large spectral range.

Accordingly, the FlexRay signal may also be "concealed" in the vehicle electrical system in the case of a PLC system to subject the subscribers connected to the power supply network in the vehicle to only a minimal influence. In addition, by superimposing several such FlexRay subsystems, which differ only in utilization of different subscriber-specific code sequences, a chronologically synchronized transmission of messages in the same frequency range may be achieved on the power line.

Additional features, advantages and specific embodiments of example embodiments of the present invention are explained in greater detail below on the basis of the figures.

DETAILED DESCRIPTION

Figure 1:
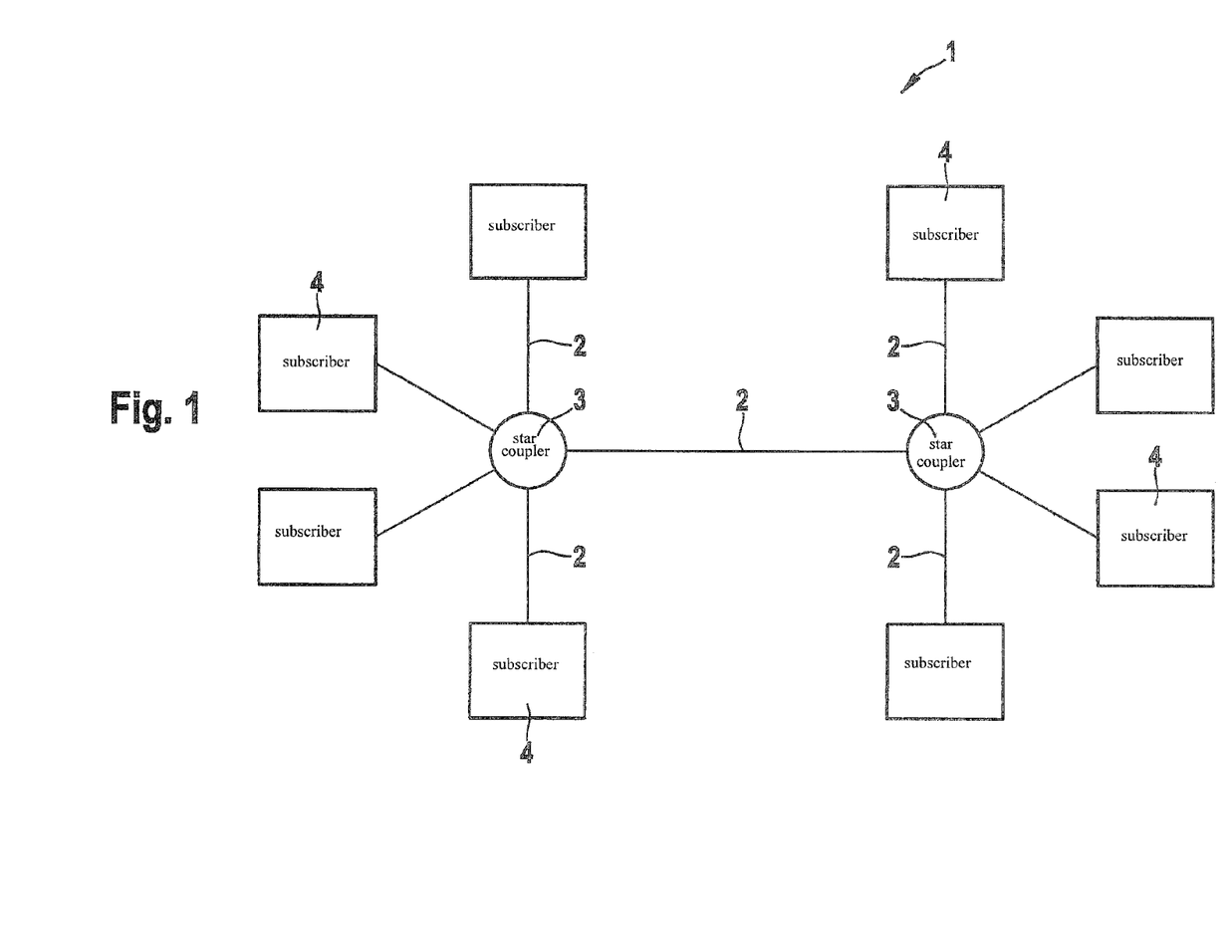
FIG. 1 shows a FlexRay communication system according to an example embodiment of the present invention, using a physical medium as the powerline structure.

FIG. 1 shows a communication system according to example embodiments of the present invention, labeled in its totality with reference numeral 1. System 1 includes a communication medium 2, which may be designed as one or more data transmission lines, one or more radio connections, or as one or more optical connections (e.g., infrared connections) or the like. Communication medium 2 has two active star couplers 3, which impart a star structure to medium 2. Furthermore, communication system 2 has multiple subscribers 4, only eight of which are shown as examples in the figure. Subscribers 4 are connected to communication medium 2 for the purpose of data transmission among one another. In communication system 1 depicted here, data are transmitted according to a FlexRay protocol specification, preferably according to currently valid specification V.2.1. In doing so, data are transmitted according to the TDMA (time divisional multiple access) method in time slots of a recurring communication cycle. Example embodiments of the present invention also include communication systems in which data are transmitted according to another protocol specification, which provides for data transmission in time slots of recurring communication cycles, in particular for data transmission according to the TDMA method. Example embodiments of the present invention also include in particular communication systems in which data are transmitted according to a FlexRay specification to be developed further in the future.

According to the FlexRay specification currently in effect, a certain time slot is assigned to each subscriber 4 and/or each message in a static segment of the communication cycle. In this way, a deterministic data transmission may be implemented, which is extremely important for safety-relevant applications in particular. Furthermore, a dynamic segment is provided in the communication cycle, allowing event-triggered data transmission in which the sequence of the data transmission depends on the importance, i.e., priority, of the messages. High-priority messages are transmitted promptly, lower-priority messages are transmitted somewhat later, under some circumstances not until a subsequent cycle.

In the present example embodiment, a powerline structure via which subscribers 4 are supplied with power is used as communication medium 2. Use of a powerline structure for supplying power to subscribers 4 as well as for transmitting data among subscribers 4 is also known as powerline communications (PLC). In using communication system 1 in a motor vehicle, the cable tree of the vehicle may be utilized to implement a PLC as communication medium 2. It is advantageous if the cable tree is embodied in a particular manner and adapted to the data transmission. For example, measures may be taken by which the input impedance of the individual branches entering into star coupler 3 is adjusted at a certain level. Such a cable tree is also known as a modified or conditioned cable tree. A conditioned cable tree makes available an almost ideal transmission function. A corresponding modified cable tree for use as a physical layer of a FlexRay communication medium 2 is described in detail in DE 101 42 409, for example, and in DE 101 42 410 in particular. Data may be transmitted over such a conditioned cable tree without any major interference and at a relatively high data rate. This type of data transmission is therefore also known as HDR (high-data-rate) PLC.

For better utilization of the available frequency range in communication medium 2, i.e., according to the FlexRay specification, it is proposed according to example embodiments of the present invention that FlexRay communication system 1 should be expanded in such a way that data to be transmitted is spread spectrally by a certain code sequence before transmission and that the spread data should then be transmitted in the time slots of the recurring communication cycles. In each time slot, several messages, even originating from different subscribers 4, may be transmitted at the same time, each datum transmitted in the same time slot having been encoded with a special code by which data are identified at the receiver, i.e., assigned to a certain transmitting subscriber, and may be decoded.

Data spreading means that a bit period of 100 ns, for example, such as that occurring in FlexRay, is shortened by a certain factor to yield, using a factor 10, a processing rate of 100 Mbit at the transmitting subscriber and at the receiving subscriber, whereas the transmission rate still remains at 10 Mbit. The energy of a data symbol is distributed over a large spectral frequency range, so that better compliance with EMC guidelines is possible with example embodiments of the present invention. Example embodiments of the present invention are implemented by multiplying the data stream by a code sequence at the transmitting subscriber.

A CDMA (code division multiple access) method is preferably used for spreading the data stream. Different CDMA systems are compared from the standpoint of a possible application in the automotive field for inexpensive expansion of a FlexRay-based communication. Systems known from the related art per se include DS (direct-sequence), FH (frequency-hopping), and TH (time-hopping) CDMA systems. Time-hopping CDMA systems do not play any role, i.e., they offer hardly any advantages over the TDMA FlexRay system already in existence. However, the two remaining CDMA systems offer definite advantages in comparison with classical FDMA and TDMA systems with regard to transmission quality and frequency economy.

Although FH-CDMA systems promise a greater process gain and shorter acquisition time, their efficiency depends greatly on the efficiency of the frequency generator used. This frequency generator will turn out to be extremely complex for an application in FH-CDMA systems because of the extremely high switching speed required and will cause high costs. FH-CDMA systems are therefore of little interest for use in a motor vehicle.

In contrast with that, DS-CDMA systems are characterized by their comparatively simple implementability. The required code generators are easily and inexpensively implementable by shift register circuits and do not require complex hardware. Furthermore, they are characterized by a simple receiver structure which is based on the ACF (autocorrelation function) properties of the code sequences used. Such a DS-CDMA system is therefore preferably used in example embodiments of the present invention.

Spread spectrum systems (band spread transmission systems) form the basis of the CDMA method. The characteristic of the spread spectrum technique is that signals are spread over a large frequency range and are transmitted with a much greater bandwidth than would correspond to their original data rate.

A distinction is made in general between DS, FH, and TH spread spectrum methods as well as various hybrid forms. DS band spreading is of interest specifically for implementation in a high-speed PLC system in a motor vehicle and is discussed in greater detail below.

In DS band spreading, a binary data symbol is multiplied directly by a high-rate binary code sequence of period N (the individual bits of code sequence are known as chips). The multiplication is performed in such a way that a data symbol is multiplied exactly times a period of the chip sequence. The following equation thus holds for the relationship between data symbol duration Tb and chip period Tc:

$$T_b = N \cdot T_c$$

By this multiplication the resulting symbol becomes broadband in comparison with the original data symbol because the bandwidth of data symbol Bb=1/Tb is much smaller than chip bandwidth Bc=1/Tc. The following equation then holds approximately for resulting bandwidth BDS:

$$B_{DS} \approx B_c \gg B_b$$

The data signal is thus spread spectrally. The process gain of a DS-CDMA system may thus be defined as follows:

$$G_p = \frac{B_{DS}}{R_b} = \frac{T_b}{T_c} = N$$

where $R_b = 1/T_b$, the data rate of the signal.

The signal-to-noise ratio (S/N) is defined by the ratio of the received signal energy of the desired signal to the total noise power. Thus, if only Gaussian noise is taken into account, the following equation holds for S/N in DS systems:

$$\frac{S}{N} = \frac{E_b}{N_o} \cdot \frac{1}{G_p}$$

Figure 2:
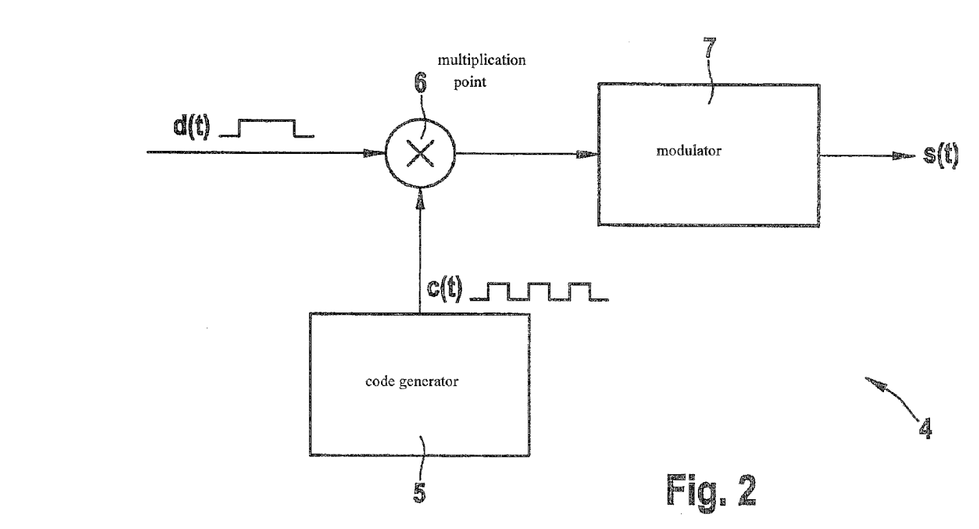
FIG. 2 shows a flow chart to illustrate direct-sequence band spreading.

A signal spread in this manner distributes the signal energy over a wide frequency range. FIG. 2 shows the basic structure of DS band spreading. BPSK (binary phase shift keying) modulation is to be regarded as an example here and corresponds to the DBPSK (differential binary phase shift keying) method of automotive PLC system 1. In principle, higher-quality modulation methods, e.g., QPSK (quadrature phase shift keying) or 8-PSK, may also be used. The data stream to be transmitted from subscriber 4 over communication medium 2 is designated as d(t). In a code generator 5, a code sequence c(t) by which data stream d(t) is multiplied in a multiplication point 6 is generated. In BPSK modulator 7, the signal resulting from this multiplication is modulated. From the output signal of modulator 7, this yields s(t)=A·d(t)·c(t)·cos(ω_c t+φ)·Chip rate $R_c = 1/T_c$ is much greater than data rate $R = 1/T_b$.

According to the structure of a FlexRay system 1, a plurality of subscribers 4 accesses an identical medium 2 (physical layer) and an identical frequency range (in the case of the structure of the HDR-PLC system, in particular the conditioned channel). To avoid collision of messages on the channel, the FlexRay protocol operates according to the time division multiple access (TDMA) method to solve the multiple access problem. This approach requires a global system time, to which various subscribers 4 must be synchronized and then may transmit in assigned disjunct (virtual) time slots.

If a frequency division multiple access (FDMA) method is to be used to expand FlexRay communication system 1, then an expansion of system 1 on the analog side is required. In particular, high precision and therefore also expensive frequency generators are necessary, which are able to provide the corresponding carrier frequencies. An alternative to expansion of the system on the analog side, allowing chronologically synchronous operation of multiple subsystems (subscribers 4) on an identical medium 2 in the same frequency range and on the same channel, is presented according to example embodiments of the present invention. The advantage here is that the analog portion of the previous transceiver design may still be utilized with essentially no change. A few minor expansions are added only in the range of digital signal processes but these are negligible from the standpoint of the cost in comparison with the analog components of the system.

The method according to example embodiments of the present invention for channel separation is the code division multiple access (CDMA) method, which is based on the spread spectrum technology described above utilizing the direct-sequence (DS) band spreading method. Each subscriber 4 of such a system 1 is assigned a code sequence for spectral spreading. Spread spectrum technology may be used to advantage in multiuser communication systems 1 by constructing differentiable signals by using orthogonal and/or quasi-orthogonal code sequences for spectral spreading. A signal constructed in this way is then assigned to each subscriber 4 of such a system 1.

This yields the following definition of a CDMA system for expansion of a FlexRay system 1, in particular an HDR-PLC system:

A plurality of subscribers 4 spreads its signals spectrally and transmits them at the same time in the same frequency band. Individual subscribers 4 and/or the signal streams transmitted by them are separated by using suitable code sets by which their orthogonal and/or quasi-orthogonal signals are generated. Various FlexRay subsystems thus allow synchronous transmission of information on communication medium 2 and/or the power lines in the motor vehicle.

The main difference from the traditional multiple-access methods mentioned above is that orthogonality is not required in the frequency range or in the time range to differentiate the signals. All subscribers 4 of a system 1 may thus transmit at the same time and in the same frequency band.

Code sets that are to be used in a direct-sequence CDMA system must essentially have the following properties:

Good autocorrelation properties: these are necessary to estimate the channel pulse response in a direct-sequence CDMA receiver and for a rapid and reliable initial synchronization (acquisition).

Good cross-correlation properties: these are necessary to minimize the mutual interference of individual subscribers 4 (low crosstalk); mutual interference should be interpreted as additional noise.

Sufficiently large code set (sufficient number of different codes): this is important for an application in a communication system in the automotive field because a large number of subscribers 4 are to be supplied with their help (rule of thumb: size of the code set≈band spreading factor).

All these properties are substantially met by so-called shift register sequences. Thus, in the described direct-sequence band spreading, first a data symbol having the period of a code sequence is multiplied in multiplication point 6. This multiplication is in effect for the description of band spreading on the digitally modulated signal side. On the logic side, the operation corresponding to multiplication is modulo 2 addition. The code sequences are defined and constructed on the binary side.

Since in direct-sequence CDMA systems, all subscribers transmit at the same time and in the same frequency band, the correlation properties of the digitally modulated signals are important for further considerations. An analysis of these properties is performed on the signal side accordingly. The bit formed from the linkage of data bit and code bit is PSK-modulated in modulator 7. Therefore, the correlation properties of signals constructed in this important are important for the further discussion. PSK-modulated signals may be represented as signal vectors in the complex plane. The mutual influence between two signals is described mathematically by forming the cross-correlation function in communication technology.

As already mentioned, the definition and construction of the code sequences take place on the logic side, i.e., the binary side. These sequences are generated by linear shift registers with feedback, so-called linear feedback shift registers (LFSR). Their generation by an LFSR is advantageously representable by polynomials. An LFSR having n shift registers has 2n possible register loads. Since the null sequence cannot be used as a sequence for band spreading, the following inequality is valid for period N of spread spectrum sequences generated in this manner:

$$N \leq 2^n - 1$$

The properties of shift register sequences include the fact that different phases of a sequence may be generated by the same LFSR. Sequences having a maximal period are then designated as M sequences (period $N=2^n-1$, corresponding to a primitive polynomial of degree n).

In accordance with their properties, precisely these M sequences have very good autocorrelation properties. To be used in a direct-sequence CDMA system, however, good cross-correlation properties are also necessary because in such systems 1, all subscribers 4 are transmitting at the same time and in the same frequency band. Nonideal cross-correlation properties thus mean additional interference, which should turn out to be as minor as possible. The even cross-correlation function of two M sequences preferably has a value of at least three. For special pairs of M sequences of the same length, it has a value of exactly three. We then speak of so-called preferred pairs of M sequences.

In general, the maximum secondary peak in even CCF (cross-correlation function) for preferred pairs is smaller than for all other pairs of M sequences. However, in addition to the good correlation properties, a DS-CDMA system requires a code set of sufficient size to also be able to supply a corresponding number of subscribers 4. In very general terms, the rule of thumb here is that the size of the code set should correspond approximately to the band spreading factor. The following section discusses a first approach to construction of such code sets.

The principle of maximal connected sets of M sequences is based on the expansion of the principle of preferred pairs to obtain larger sets of sequences. A maximal connected set of M sequences contains $M_n$ sequences in which all pairs form preferred pairs. However, it still holds that $M_n \leq 6$. Maximal connected sets are therefore suitable only in applications in which a few sequences having excellent ACF and CCF properties are required.

The Gold codes, named after R. Gold, are another code set developed on the basis of preferred pairs. Gold codes are periodic sequences which form large sets and have good correlation properties. In construction of Gold codes, it is found that in comparison with preferred pairs of M sequences, their favorable even cross-correlation properties remain intact, but at the expense of less favorable even autocorrelation properties. Further, it is again true here that uneven correlation properties turn out much less favorably than even ones.

The good autocorrelation of so-called Barker code sequences facilitates acquisition and allows a good estimate of channel pulse response with the help of a correlation receiver. Good cross-correlation of sequences is necessary to be able to perform a reliable separation of users. Since all subscribers are transmitting at the same time and in the same frequency band in direct-sequence CDMA systems, cross-correlations determine the degree of interference occurring additionally.

Other possible code sets include, for example, Kasami codes and Walsh codes.

Code sets that allow construction of quasi-orthogonal signals by direct-sequence band spreading were presented in the preceding section. However, a fundamental problem of direct-sequence CDMA systems is apparent here. The demand for ideal correlation properties runs counter to the demand for sufficiently large set size. There is no population of shift register sequences having ideal periodic correlation properties. Compromises are therefore required at this point. Although for the field of communication systems in a motor vehicle, in particular HDR-PLC systems, Gold codes have very favorable properties with regard to the ratio of set size to correlation properties.

Figure 3:
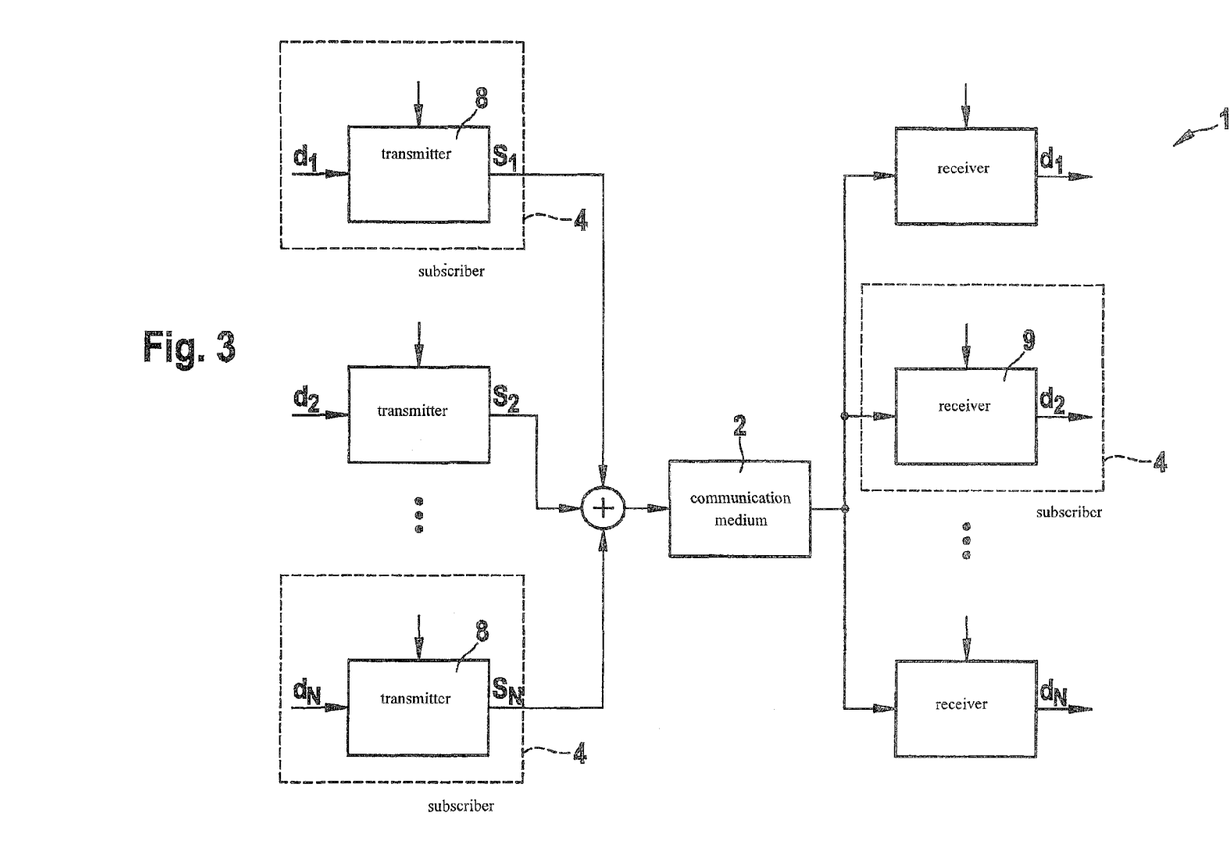
FIG. 3 shows a schematic view of a communication system according to example embodiments of the present invention.

FIG. 3 shows the diagram of FlexRay communication system 1 expanded by a direct-sequence CDMA system. Each branch on the left side corresponds to one subscriber 4 of system 1. It includes data stream di(t), code sequence DS-I, and transmitter i, which is labeled with reference numeral 8 and in which the band spreading is performed via code sequence DS-i. For example, data stream dl of subscriber #1 is spectrally spread in transmitter #1 using direct-sequence code sequence #1, then is despread in a receiver 9 with a duplicate of this sequence, so data d'1 transmitted are thereby detected. Despreading using another code sequence is impossible, i.e., only by knowing the code sequence used in the transmitter is detection possible at all in principle. The receiver used is a correlation receiver. Such a correlation receiver is present anyway as a reception filter in VHDL (VHSIC (very high speed integrated circuit) hardware description language) in the previous transceiver system of subscribers 4 of a FlexRay system. The process gain of the band spreading transmission is also associated with this correlation because in the ideal case, noise is suppressed by the process gain factor. Since all subscribers 4 are transmitting at the same instant and in the same frequency band, there is additive superpositioning of their signals in the channel (see FIG. 3).

Nonideal cross-correlation properties will thus cause additional interference. Channel block 2 represents the power line, i.e., the conditioned power line in its property as a communication channel.

As an alternative to a correlation receiver, a so-called SAW-TDL (surface acoustic wave tapped delay line) filter may also be used on the receiver side for decoding data transmitted by the method according to the present invention. Due to the simultaneous transmission, subscribers 4 cause mutual interference. A multiuser detector may be used to reduce so-called multiuser interference. The multiuser detector described below may be implemented as a detector for surface acoustic waves (surface acoustic wave tapped delay line—SAW-TDL) by using tapped delay lines for surface acoustic waves.

The piezoelectric or the reciprocal piezoelectric effect is utilized in generating surface acoustic waves (SAW) electrically and converting them back into electrical signals. For this reason, materials having strong piezoelectric properties are used as substrate materials in manufacturing of components for surface acoustic waves. According to FIG. 4, a tapped delay line for surface acoustic waves includes an input converter 10 that converts an electrical input signal 12 into a surface acoustic wave and an output converter 11 that in turn obtains an electrical signal 13 from the surface acoustic wave.

Figure 4:
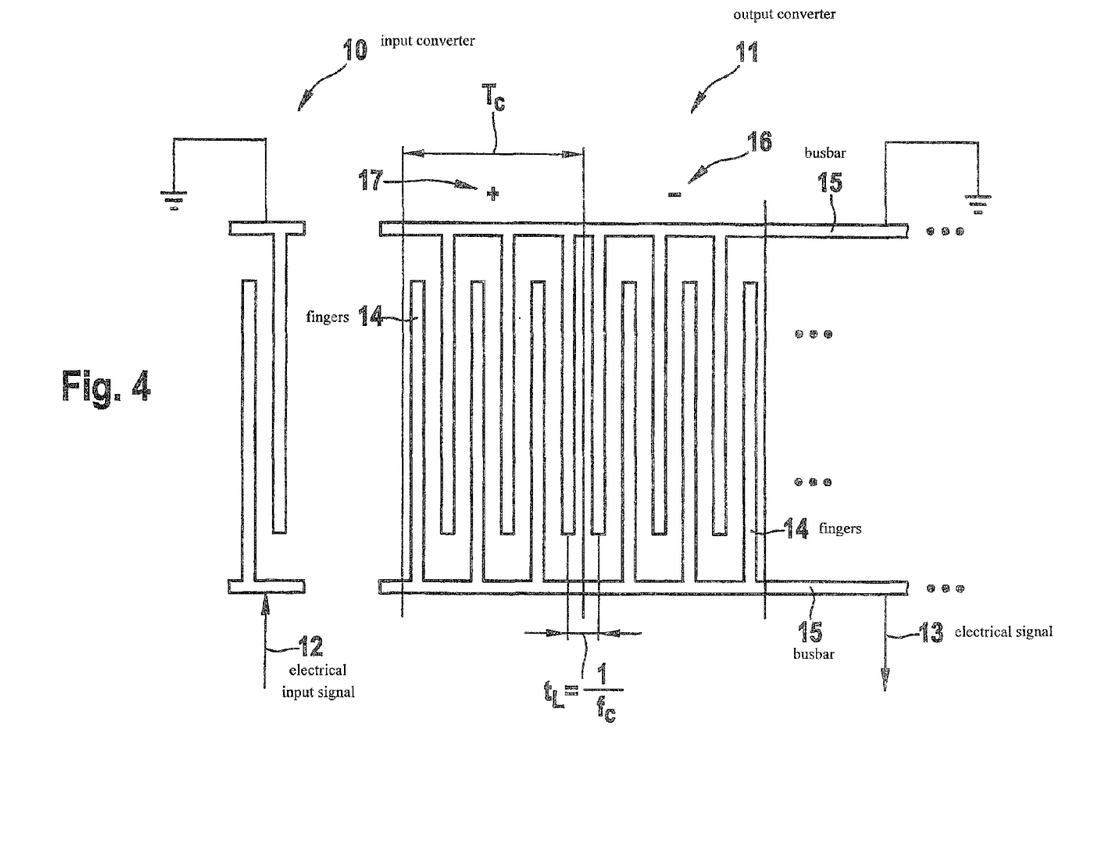
FIG. 4 shows a simplified diagram, a single-user detector having one SAW-TDL 18.

According to FIG. 4, the acoustic wave triggered by input converter 10 generates a voltage proportional to the particular finger length on each finger 14 of output converter 11. If the connection sequence of fingers 14 to busbar 15 is altered, the positive or negative sign of the voltage induced by each pair of fingers of this group on busbars 15 is reversed. One finger group is known as "tap" 16. The signal coming from input converter 10 arrives later, as finger 14 of output converter 11 is farther away from input converter 10. At each instant, the voltages of individual fingers 14 having programmed sign 17 are added up on busbars 15. The pulse response of the component corresponds to a sinusoidal signal having the programmed phase jumps.

The size of SAW-TDLs is determined by the finger spacing, the number of fingers 14 and mid-frequency fc of the information signal. The rate of propagation of the surface waves is 3000 to 4000 m/s. This yields a wavelength of the surface wave of approximately 3 μm to 300 μm for mid-frequencies from approximately 10 MHz up to several hundred MHz. The usual SAW filters, like digital filters, are so-called transverse filters made up of delay elements, multipliers, and adders instead of coil, capacitor, and resistor as individual components. These components may be used as easy-to-handle and inexpensive matched filters for pseudo-random phase-jump-modulated sinusoidal signals. SAW-TDLs are analog passive filters. With the help of a tapped delay line, a rectifier and a threshold value detector, a precise system synchronization may be accomplished easily.

Figure 5:
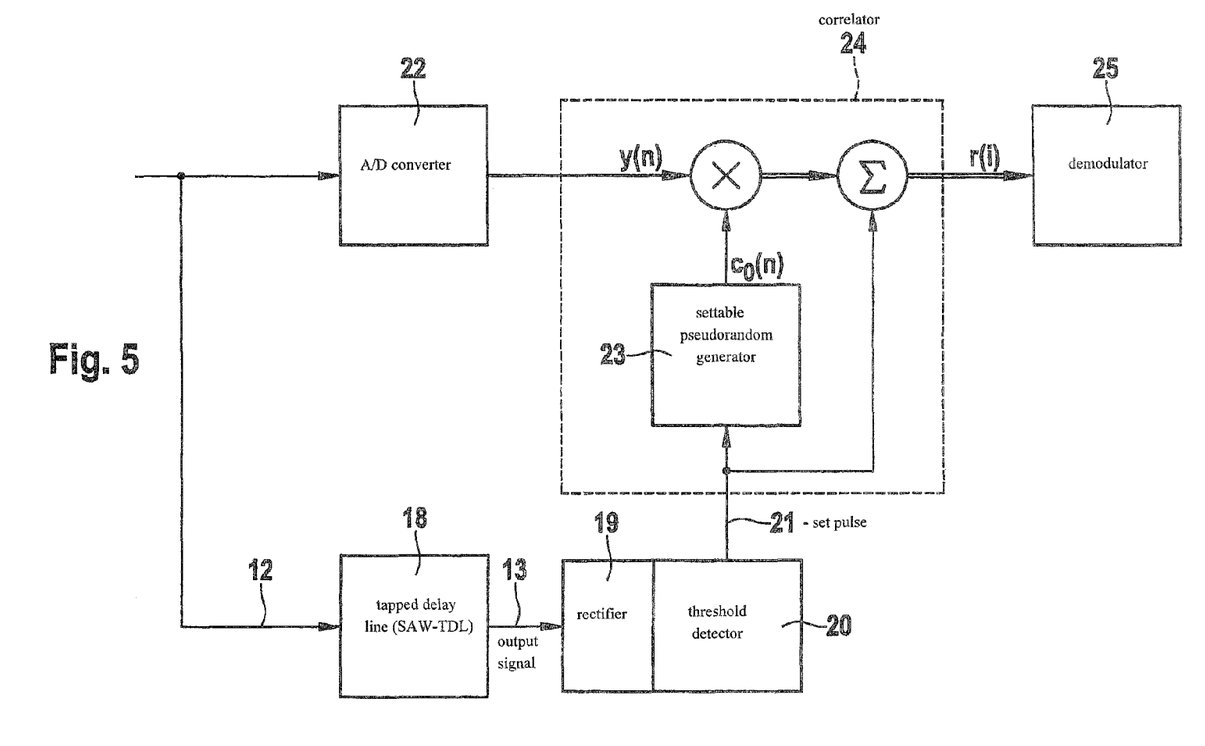
FIG. 5 shows the construction of a receiver structure having SAW-TDLs.

FIG. 5 shows the construction of a receiver structure having SAW-TDLs. For a simplified diagram, a single-user detector having one SAW-TDL 18 (see FIG. 4) is shown. Additional SAW-TDLs are to be added to the structure accordingly for a multiuser detector.

Delay line (i.e., SAW-TDL) 18 has taps 16 in the "time" interval of the clock frequency of code sequence 1/Tc. Output signal 13 of the tapped delay line in general has a very small amplitude. Only when the phase jumps of reception signal 12 of the signal segment stored in the delay line fit the segment of the code sequence programmed in the delay line is the amplitude of output signal 13 large. This maximal amplitude of output signal 13 occurs in time intervals $T_b = N \cdot T_c$, where N denotes the period length of the code sequence. Output signal 13 of tapped delay line (SAW-TDL) 18, rectified in a rectifier 19 and supplied to a threshold detector 20, may be interpreted as a digital signal and is referred to as set pulse 21. On the one hand, this provides accurate information about the instant of the main peak, i.e., the correct sampling time, and on the other hand, the set pulse is used for synchronization of the receiver clock pulse. On the basis of the synchronization information thereby obtained, there is a synchronous multiplication of input signal 12 or input signal y(n) using code sequence c(n) after processing signal 12 in a mixer and AD converter 22. A settable pseudorandom generator for generating codes $c_i(n)$ is labeled with reference numeral 23 and the correlator in its totality is labeled with reference numeral 24. The demodulator is denoted with reference numeral 25.

Acquisition and tracking in direct-sequence CDMA systems are described below. Acquisition in the receiver refers to the operation of initial synchronization to the signal of the transmitter. For all CDMA systems, this is equivalent to establishing the synchronicity between the clock pulse of the code sequence in the transmitter and that in the receiver. After this initial synchronization, measures are needed to maintain a constant code clock pulse after being set. This operation is known as tracking. Since both tasks are to be assigned more to the system management, the principles, which are known from the literature per se, will only be mentioned briefly here.

The best known acquisition devices may be subdivided approximately into:
  Acquisition with serial search,
  Acquisition with sequential search, and
  Acquisition with matched filter.

In all these acquisition methods, the reception signal is multiplied by a locally generated code sequence. If the relative shift between the transmitter code sequence and the receiver code sequence is greater than simple chip time $T_c$, then the signal is determined by the noise after narrow band filtering because it remains spread. However, if this relative shift is less than $T_c$, the useful signal power at the filter output increases and a threshold value decider detects the presence of a signal. Another possibility is to use code sequences of different lengths for acquisition and during the actual transmission operation.

As a rule, the two following principles are used for tracking:

Delay locked loop (DLL) and
Tau-dither loop (TDL)

It may be assumed that the bit error probability is greater with K subscribers 4 than with only a single subscriber in the communication system 1 according to example embodiments of the present invention if the interference caused by other subscribers 4 may be interpreted approximately as additive Gaussian noise process.

The expansion to a direct-sequence CDMA system offers some important advantages for an application in the automotive PLC field utilizing the FlexRay protocol:

In direct-sequence CDMA systems, several subscribers are transmitting at the same time in the same frequency band, i.e., using an identical transceiver. This is possible because the differentiability of the signals of the individual subscribers is given not by orthogonality with respect to time or frequency but instead by the code sequences used for band spreading. Furthermore, in contrast with FDMA systems, only one carrier frequency is needed for all subscribers.

Through random scrambling of the interference caused by all subscribers, averaging effects are obtained in the consideration of the interference ratios because all subscribers are transmitting in the same frequency band. The consequence of this is that the interference caused by the other subscribers is lower in the case of a direct-sequence CDMA system than with traditional methods.

Gradual decline (so-called degradation) in transmission quality with an increase in the number of subscribers. Direct-sequence CDMA systems are interference limited, i.e., transmission quality is determined essentially by the mutual interference of the individual subscribers due to the nonideal cross-correlation properties of the band spreading sequences. This interference and the averaging effects mentioned in the preceding point do not yield an abrupt degradation in transmission conditions but instead yield a gradual degradation. In a direct-sequence CDMA system, it is thus possible to add another subscriber whose interfering influence is then distributed among all other subscribers.

On the whole, these points produce an increased spectral efficiency for direct-sequence CDMA systems in comparison with the traditional FlexRay TDMA system.

Direct-sequence CDMA systems are insensitive to frequency-selective fading. Due to the broad-band capacity of the system, the energy in the entire band remains approximately constant despite short-term level collapses in sub-bands.

Possibility of coexistence with pre-existing analog systems, with reduced capacity of both systems. Due to spreading, the energy of a data signal is distributed over a very large spectral range, so the portion that comes to lie as interference in an analog narrow-band channel is acceptable for these analog systems.

And finally, synchronous data transmission through subsystems.

The above points constitute essential advantages of direct-sequence CDMA systems in comparison with traditional systems with regard to frequency economy, system management, and transmission quality.

What is claimed is:

1. A method for transmitting data of a data stream via a communication medium of a communication system, comprising:
   dividing recurring communication cycles into static and dynamic segments, each of the static and dynamic segments being assigned to a time slot;
   spreading the data of the data stream spectrally via a certain code sequence before transmission; and
   transmitting the spread data in assigned time slots via a powerline structure of the communication system;
   wherein the spread data transmitted in time slots corresponding to static segments represent synchronous message transmission and the spread data transmitted in time slots corresponding to dynamic segments represent asynchronous message transmission;
   wherein the spread data are transmitted according to a FlexRay protocol specification in the communication system;
   wherein the powerline structure is used for power supply to subscribers of the communication system as well as for data transmission between the subscribers.

2. The method according to claim 1, wherein multiple subscribers of the communication system each transmit data of a data stream, and the data to be transmitted by the subscribers are spread spectrally using different code sequences.

3. The method according to claim 2, wherein the spread data to be transmitted by the subscribers are transmitted in synchronization in an identical frequency band.

4. The method according to claim 2, wherein at least one of (a) orthogonal and (b) quasi-orthogonal data signals are generated via the different code sequences of the transmitting subscribers.

5. The method according to claim 1, wherein data to be transmitted are spread using a direct-sequence band-spreading method.

6. The method according to claim 1, wherein the code sequences are generated using linear shift registers having feedback.

7. A subscriber of a communication system for transmitting data of a data stream, the communication system including a communication medium, the subscriber, and at least one additional subscriber, the subscribers being connected to the communication medium for the purpose of data transmission, comprising:
   a device adapted for spectral spreading of the data of the data stream before transmission via a certain code sequence; and
   a device adapted to transmit the spread data in assigned time slots via a powerline structure of the communication system, wherein recurring communication cycles of the communication system are divided into static and dynamic segments, each of the static and dynamic segments being assigned to a time slot;
   wherein the spread data transmitted in time slots corresponding to static segments represent synchronous message transmission and the spread data transmitted in time slots corresponding to dynamic segments represent asynchronous message transmission;
   wherein the spread data are transmitted according to a FlexRay protocol specification in the communication system;
   wherein the powerline structure is used for power supply to subscribers of the communication system as well as for data transmission between the subscribers.

8. The subscriber according to claim 7, further comprising a device adapted to receive the spread data in the time slots of the recurring communication cycles and a device adapted to despread the received spread data via a certain code sequence, the code sequence for despreading being dependent on the code sequence used for spreading.

9. The subscriber according to claim 7, wherein the subscriber is adapted to perform the method according to claim 1.

10. A communication system for transmitting data of a data stream, comprising:
   a communication medium having multiple subscribers connected to the communication medium;
   wherein recurring communication cycles of the communication system are divided into static and dynamic segments, each of the static and dynamic segments being assigned to a time slot, and wherein transmitting subscribers of the communication system each include a device adapted for spectral spreading of the data of the data stream via a certain code sequence before transmission and a device adapted to transmit the spread data in assigned time slots via a powerline structure of the communication system;
   wherein the spread data transmitted in time slots corresponding to static segments represent synchronous message transmission and the spread data transmitted in time slots corresponding to dynamic segments represent asynchronous message transmission;
   wherein the spread data are transmitted according to a FlexRay protocol specification in the communication system;
   wherein the powerline structure is used for power supply to subscribers of the communication system as well as for data transmission between the subscribers.

11. The communication system according to claim 10, wherein the subscribers of the communication system are adapted to perform the method according to claim 1.

* * * * *

UNITED STATES PATENT AND TRADEMARK OFFICE
CERTIFICATE OF CORRECTION

PATENT NO.      : 8,422,534 B2
APPLICATION NO. : 12/304810
DATED           : April 16, 2013
INVENTOR(S)     : Lucas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this
Eighth Day of September, 2015

Michelle K. Lee
*Director of the United States Patent and Trademark Office*